United States Patent
Shibuya (10) Patent No.: US 9,519,256 B2
(45) Date of Patent: Dec. 13, 2016

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Yuichiro Shibuya, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/946,659

(22) Filed: Nov. 19, 2015

(65) Prior Publication Data
US 2016/0154368 A1    Jun. 2, 2016

(30) Foreign Application Priority Data
Nov. 28, 2014 (JP) .................. 2014-242458

(51) Int. Cl.
*G03G 21/00* (2006.01)
*G03G 15/00* (2006.01)
*H04N 1/06* (2006.01)

(52) U.S. Cl.
CPC .......... *G03G 21/00* (2013.01); *G03G 15/5041* (2013.01); *H04N 1/06* (2013.01); *G03G 2215/0145* (2013.01); *H04N 2201/0094* (2013.01)

(58) Field of Classification Search
CPC G03G 21/00; G03G 21/0005; G03G 21/0011; G03G 2221/0089; G03G 15/5041
See application file for complete search history.

(56) References Cited

U.S. PATENT DOCUMENTS

| | | | | |
|---|---|---|---|---|
| 5,915,156 A | * | 6/1999 | Kizaki | G03G 21/0029 399/346 |
| 2009/0129793 A1 | * | 5/2009 | Milton | G03G 21/0011 399/38 |
| 2010/0081077 A1 | * | 4/2010 | Testardi | G03G 21/0011 430/124.11 |

FOREIGN PATENT DOCUMENTS

| JP | 2009-025348 | * | 2/2009 |
|---|---|---|---|
| JP | 2009025348 A | | 2/2009 |

\* cited by examiner

*Primary Examiner* — Sandra Brase
(74) *Attorney, Agent, or Firm* — Canon U.S.A., Inc., IP Division

(57) ABSTRACT

An image forming apparatus includes a measurement unit configured to measure a density of an image that an image forming unit forms, an acquisition unit configured to acquire an image processing parameter serving as a correction value used to correct the measured density of the image, a generation unit configured to generate a cleaning patch image using the acquired image processing parameter, and a cleaning patch image forming unit configured to form the cleaning patch image generated by the generation unit on an image bearing member, wherein the cleaning patch image is formed during an interval after a first image is formed by the image forming unit on the image bearing member but before a second image having a printing instruction issued subsequent to a printing instruction issued for the first image is formed by the image forming unit on the image bearing member.

7 Claims, 10 Drawing Sheets

IMAGE FORMING APPARATUS, IMAGE FORMING METHOD, AND STORAGE MEDIUM

BACKGROUND OF THE INVENTION

Field of the Invention

Aspects of the present invention generally relate to an image forming apparatus equipped with a cleaning device that removes toner by bringing a cleaning blade into contact with an image bearing member.

Description of the Related Art

Many image forming apparatuses using toner, such as copying machines, printers, and multifunction peripherals, are equipped with a cleaning device that removes unnecessary toner by bringing a cleaning blade into contact with the surface of an image bearing member, which includes an intermediate transfer member, or a recording material conveyance member.

In such a cleaning device, it is desirable to keep a certain amount of toner as lubricant lying at a contact portion of the cleaning blade so as to reduce frictional load of the cleaning blade and to maintain a cleaning function normally.

If the amount of such toner is small, the effect of lubricant cannot be obtained, so that a failure in cleaning may occur. On the other hand, if the amount of toner is too large, toner smudges on the back of paper or toner smudges on a printed image may be caused. Therefore, it is necessary to adjust the amount of toner to be supplied to the cleaning device to an adequate amount.

Japanese Patent Application Laid-Open No. 2009-25348 discusses a technique to cause a toner image constantly with a constant density to be formed in an interval between images to be transferred, by changing an image forming condition even if a characteristic change of an image bearing member or toner occurs due to an environmental change or temporal change. As a result, there can be provided an image forming apparatus capable of constantly supplying a constant amount of toner to the cleaning device as needed.

At the time of continuous printing, in order to supply an adequate amount of toner to the cleaning device at an inter-sheet interval, which is an interval between image formation for printing and image formation for subsequent printing, it is necessary to perform an image forming condition change, which is time-consuming. Therefore, it is difficult to maintain the maximum throughput of continuous printing.

SUMMARY OF THE INVENTION

According to an aspect of the present invention, an image forming apparatus includes a measurement unit configured to measure a density of an image that an image forming unit forms, an acquisition unit configured to acquire an image processing parameter serving as a correction value used to correct the density of the image measured by the measurement unit, a generation unit configured to generate a cleaning patch image using the image processing parameter acquired by the acquisition unit, and a cleaning patch image forming unit configured to form the cleaning patch image generated by the generation unit on an image bearing member, wherein the cleaning patch image is formed during an interval after a first image is formed by the image forming unit on the image bearing member but before a second image having a printing instruction issued subsequent to a printing instruction issued for the first image is formed by the image forming unit on the image bearing member.

According to an exemplary embodiment of the present invention, after an image processing parameter is generated from a density measurement result in density control processing, a cleaning patch image on which image processing for making an engine density level adequate is performed is previously generated. As a result, it becomes possible to output a cleaning patch image, which serves as an adequate amount of lubricant, to the cleaning blade in an inter-sheet interval while maintaining the maximum throughput of continuous printing.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

(System Configuration of Image Forming Apparatus)

Figure 1:
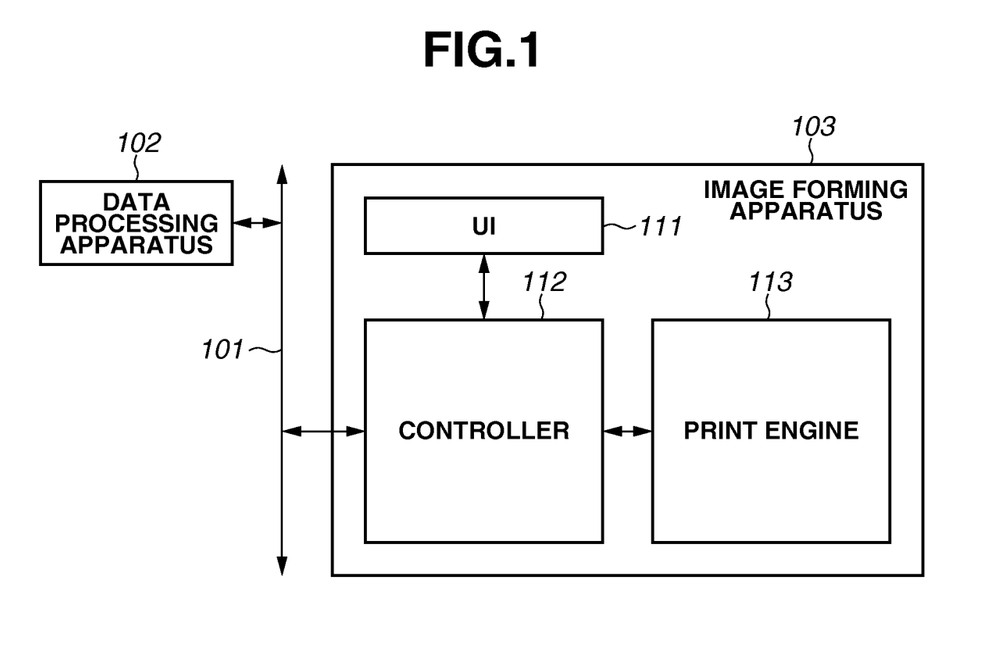
FIG. 1 is a block diagram illustrating a system configuration of an image forming apparatus according to a first exemplary embodiment of the present invention.

FIG. 1 is a block diagram illustrating a system configuration of an image forming apparatus according to a first exemplary embodiment of the present invention.

A data processing apparatus 102, such as a personal computer (PC), generates a page-description language (PDL) job and transmits the generated PDL job to an image forming apparatus 103 via a local area network (LAN) 101.

While the LAN 101 is used as a communication path between the data processing apparatus 102 and the image forming apparatus 103, it may be replaced with another interface (I/F), such as a universal serial bus (USB) connection cable.

The image forming apparatus 103, such as a laser printer, receives a PDL job from the data processing apparatus 102, and performs image formation on a transfer material (for example, a sheet of paper) 304 (FIG. 3) based on the PDL job. Furthermore, the image forming apparatus 103 may be a multifunction peripheral, which has a scanner function, a facsimile (FAX) function, and other functions.

A user interface (UI) 111 includes a display unit, which informs the user of various pieces of information, and an operation unit, which receives various operations from the user.

A controller 112 generates bitmap data based on the PDL job, and transmits the generated bit map data to a print engine 113. The details of the controller 112 are described below with reference to FIG. 2.

The print engine 113 performs image formation on the transfer material 304 using toner according to the electrophotographic method based on the bitmap data received from the controller 112. The details of the print engine 113 are described below with reference to FIG. 3.

Furthermore, the controller 112 and the print engine 113 are arranged as separate members, but may arranged as an integrated member.

(System Configuration of Controller)

Figure 2:
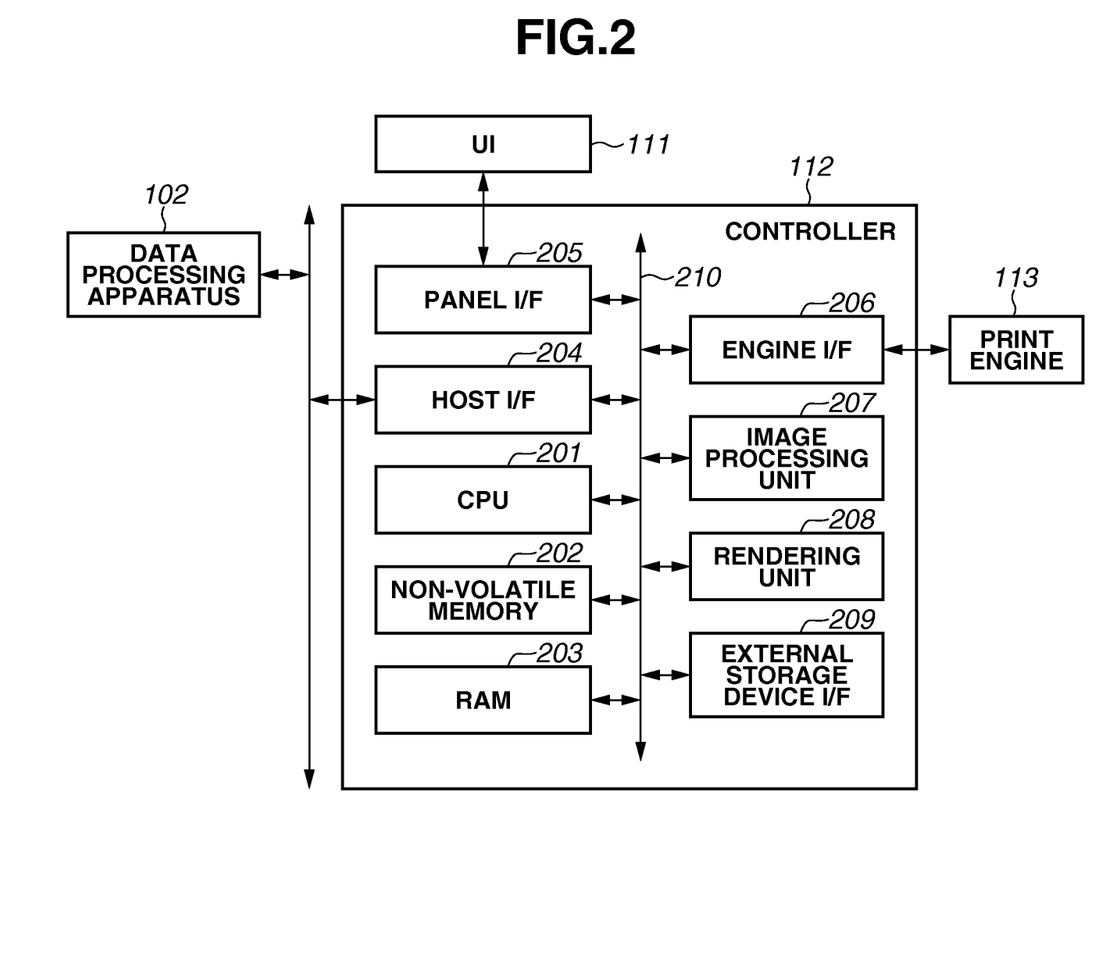
FIG. 2 is a block diagram illustrating a configuration of a controller of the image forming apparatus according to the first exemplary embodiment.

FIG. 2 is a block diagram illustrating a configuration of the controller 112 of the image forming apparatus 103 according to the present exemplary embodiment.

A central processing unit (CPU) 201 loads a program stored in a non-volatile memory 202 onto a random access memory (RAM) 203 and executes the program to control the image forming apparatus 103.

The non-volatile memory 202 stores, among others, the program to be executed by the CPU 201 and setting information about the image forming apparatus 103.

The RAM 203 stores, among others, the program loaded from the non-volatile memory 202. Furthermore, the RAM 203 also stores a PDL job, a PDL image of the bitmap format generated from the PDL job, various temporary processing statuses required for other processing operations, and log information.

A host interface (I/F) 204 interconnects the data processing apparatus 102 and the controller 112 and relays data communications therebetween, such as the transmission and reception of data.

A panel I/F 205 interconnects the UI 111 and the controller 112 and relays data communications therebetween, such as the transmission and reception of data.

An engine I/F 206 interconnects the print engine 113 and the controller 112 and relays data communications therebetween, such as the transmission and reception of data.

A rendering unit 208 generates a PDL image of the bitmap format.

An image processing unit 207 performs image processing, such as density correction, on the PDL image generated by the rendering unit 208. The density correction as performed herein is described below.

An external storage device I/F 209 interconnects a detachable external storage device (not illustrated) and the controller 112 and relays data communications therebetween, such as the transmission and reception of data.

A bus 210 is used to interconnect each unit included in the controller 112.

(System Configuration of Print Engine)

Figure 3:
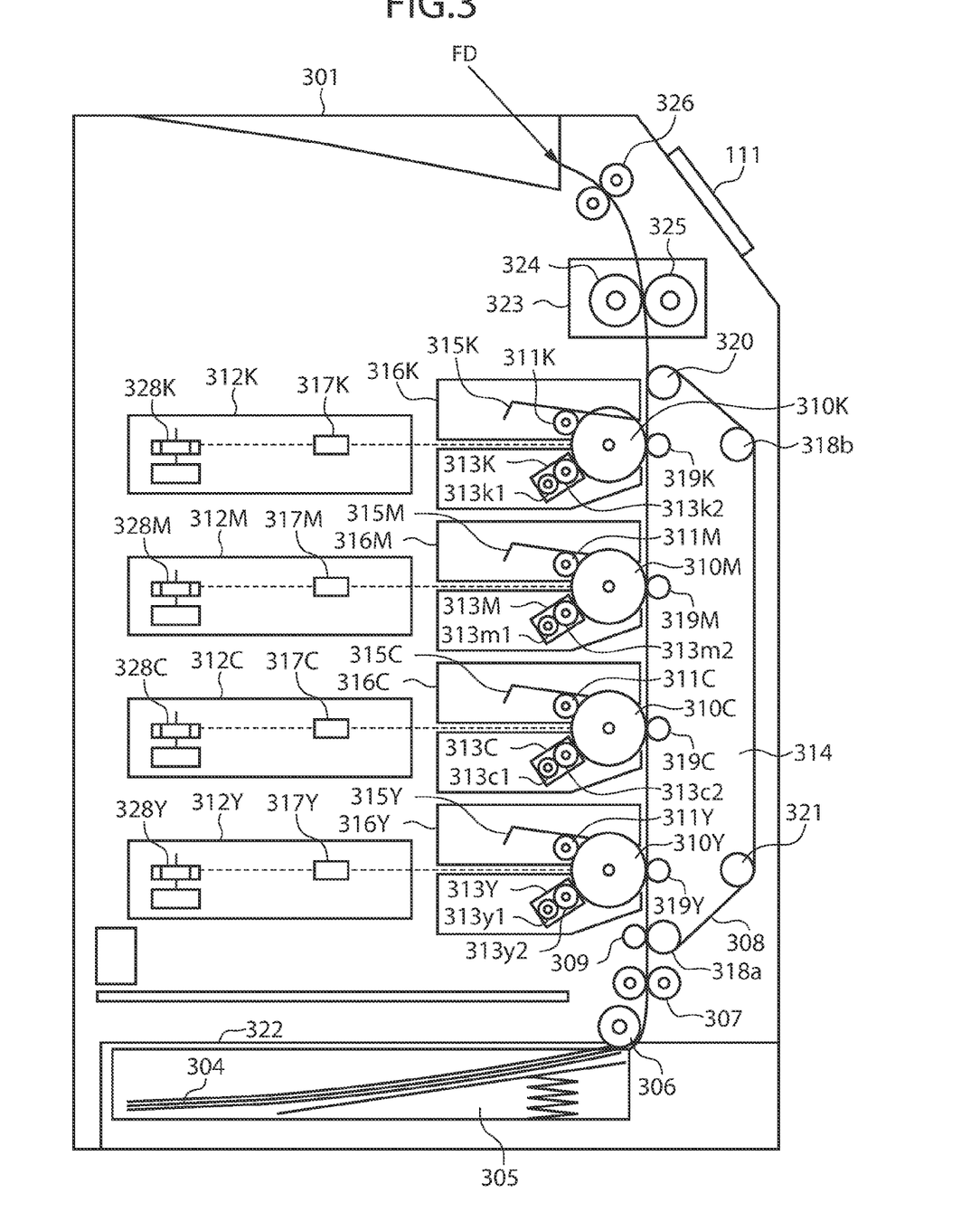
FIG. 3 is a vertical sectional view illustrating a print engine of the image forming apparatus according to the first exemplary embodiment.

FIG. 3 is a vertical sectional view illustrating the print engine 113 of the image forming apparatus 103 according to the present exemplary embodiment.

The print engine 113 of the image forming apparatus 103 illustrated in FIG. 3 includes four photosensitive drums 310, serving as image bearing members, juxtaposed in the vertical direction. Each of the photosensitive drums 310 is driven by a drive unit (not illustrated) to rotate counterclockwise as viewed in FIG. 3.

Around each of the photosensitive drums 310, there are arranged, in order in the rotating direction, a charging device 311, an exposure unit 312, a developing device 313, an electrostatic conveyance and transfer device 314, which transfers a toner image formed on the photosensitive drum 310 to a transfer material, and a cleaning device 315.

Furthermore, the photosensitive drum 310, the charging device 311, the developing device 313, and the cleaning device 315, which removes toner, are integrated into a cartridge as a process cartridge 316 for each of yellow (Y), cyan (C), magenta (M), and black (K) toners. The process cartridge 316 is configured to be detachably attached to the image forming apparatus 103.

Next, the configuration of each unit is described successively.

Each of the photosensitive drums 310 (310K, 310M, 310C, and 310Y) is supported, at the both end portions thereof, by a support member (not illustrated) in such a manner as to be rotatable, and is driven to rotate counterclockwise as viewed in FIG. 3 by a drive force being transmitted from a drive motor (not illustrated) to one of the both ends.

Each of the charging devices 311 (311K, 311M, 311C, and 311Y), which uniformly electrically charges the surface of the photosensitive drum 310, is a conductive roller formed in a roll shape. The roller is kept in contact with the surface of the photosensitive drum 310, and is supplied with a charging bias voltage from a power source (not illustrated).

Then, the surface of the photosensitive drum 310 is uniformly charged by the charging device 310. Each of the exposure devices 312 (312K, 312M, 312C, and 312Y), which irradiates the uniformly charged surface of the photosensitive drum 310 with a laser beam according to image information, is located in a direction approximately normal to the photosensitive drum 310.

Then, image light corresponding to an image signal is radiated by a laser diode (not illustrated) onto each of polygon mirrors 328 (328K, 328M, 328C, and 328Y), which is being rotated at high speed by a scanner motor (not illustrated).

The image light reflected from the polygon mirror 328 is used to selectively expose the charged surface of the photosensitive drum 310 via each of imaging lenses 317 (317K, 317M, 317C, and 317Y) to form an electrostatic latent image on the photosensitive drum 310.

The developing devices 313 (313K, 313M, 313C, and 313Y), which causes toner to adhere to the electrostatic latent image to form a toner image, are respectively composed of developing units respectively storing toners of yellow, cyan, magenta, and black in order from the upstream side in the conveyance direction of a transfer material.

During development of the electrostatic latent image on the photosensitive drum 310, toner stored in the container of the corresponding developing unit is fed by a feed mechanism (not illustrated) to a developing roller 313$y$1, 313$c$1, 313$m$1, or 313$k$1.

Then, a thin layer of toner is applied to the outer circumference of a rotating developing roller (developing device) 313$y$2, 313$c$2, 313$m$2, or 313$k$2, and electric charge is supplied to the toner (the toner is subjected to frictional electrification).

A developing bias voltage is applied to between the developing roller 313$y$2, 313$c$2, 313$m$2, or 313$k$2 and the photosensitive drum 310 with the electrostatic latent image formed thereon, thus casing toner to adhere to the electrostatic latent image to form a toner image.

Each of the cleaning devices 315 (315K, 315M, 315C, and 315Y) removes untransferred toner remaining on the surface of the photosensitive drum 310 after the toner image formed on the photosensitive drum 310 by the developing device 313 is transferred onto the transfer material 304.

A cleaning blade included in the cleaning device 315 is kept in contact with the photosensitive drum 310 to scrape off toner adhering to the photosensitive drum 310. This enables removing the untransferred toner.

Furthermore, an electrostatic conveyance belt 308, which is a belt member that makes a circular movement, is arranged in contact with the photosensitive drums 310.

The electrostatic conveyance belt 308 is vertically supported by four axes of rollers, and makes a circular movement while electrostatically attracting a transfer material onto the outer circumference surface thereof and bringing the transfer material into contact with the photosensitive drums 310.

Furthermore, an attraction roller 309 is arranged in contact with the upstream side in the transfer material conveyance direction of the electrostatic conveyance belt 308.

With regard to the conveyance of a transfer material, a bias voltage is applied to the attraction roller 309 to form an electric field between the attraction roller 309 and a roller 318a which is grounded, so that dielectric polarization is generated between the electrostatic conveyance belt 308 and the transfer material to cause an electrostatic attraction force therebetween.

Furthermore, a similar effect can also be obtained even when a bias voltage is applied to the roller 318a and another roller 318a is placed opposite thereto.

Accordingly, the transfer material is conveyed by the electrostatic conveyance belt 308 up to a transfer position, in which the toner image on the photosensitive drum 310 is sequentially transferred onto the transfer material.

Transfer rollers 319, which serve as a transfer member, corresponding to the four photosensitive drums 310 are juxtaposed in contact with the inner side (back surface side) of the electrostatic conveyance belt 308. A power source for transfer bias (not illustrated) is connected to the transfer rollers 319.

The transfer rollers 319 are located opposite the photosensitive drums 310, thus constituting a transfer unit.

Electric charge of the positive polarity is applied from the transfer rollers 319 to the transfer material through the electrostatic conveyance belt 308. An electric field generated by the electric charge causes a toner image of the negative polarity formed on the photosensitive drum 310 to be transferred onto the transfer material being in contact with the photosensitive drum 310.

In the present exemplary embodiment, the electrostatic conveyance belt 308 is stretched around four rollers, i.e., a driving roller 320, driven rollers 318 (318a and 318b), and a tension roller 321, and is arranged to rotate clockwise as viewed in FIG. 3.

Accordingly, toner images on the photosensitive drums 310 are transferred onto the transfer material 304 during the time when the transfer material 304 is conveyed from the side of the driven roller 318a to the side of the driving roller 320 according to a circular movement of the electrostatic conveyance belt 308.

In a paper feed unit 322, which feeds a transfer material 304 to an image forming unit, a plurality of transfer materials 304 are stored in a paper feed cassette 305.

During image formation, a paper feed roller 306 (a half-moon roller) and a registration roller pair 307 are driven to rotate according to an image forming operation, thus feeding transfer materials 304 in the paper feed cassette 305 separately one by one. Then, the fore end of the transfer material 304 collides with the registration roller pair 307 and temporarily stops, thus forming a loop. Then, after the rotation of the electrostatic conveyance belt 308 is synchronized with an image writing start position, the transfer material 304 starts to be fed by the registration roller pair 307 to the electrostatic conveyance belt 308.

A fixing unit 323, which fixes a plurality of toner images to the transfer material 304, includes a heating roller 324, which is driven to rotate, and a pressure roller 325, which is pressed against the heating roller 324 and applies heat and pressure to the transfer material 304.

More specifically, the transfer material 304, to which toner images formed on the photosensitive drums 310 have been transferred, is conveyed by the heating roller 324 and the pressure roller 325, which constitute a fixing roller pair, when passing through the fixing unit 323. When being conveyed, the transfer material 304 is supplied with heat and pressure by the heating roller 324 and the pressure roller 325, which constitute a fixing roller pair.

Accordingly, toner images of a plurality of colors are fixed to the surface of the transfer material 304.

Furthermore, the process cartridges 316 of yellow, magenta, and cyan can be moved upward by an elevation mechanism (not illustrated) from the state in which the photosensitive drums 310 are in contact with the electrostatic conveyance belt 308 to the state in which the photosensitive drums 310 are away from the electrostatic conveyance belt 308.

Then, the elevation mechanism is configured to operate according to the selected recording mode.

(Image Forming Operation)

Next, an image forming operation of the image forming apparatus 103 according to the present exemplary embodiment is described.

The image forming apparatus 103 rotates the photosensitive drums 310 counterclockwise as viewed in FIG. 3 in synchronization with the rotation of the electrostatic conveyance belt 308.

Then, the image forming apparatus 103 feeds the transfer material 304, which has waited at the registration roller pair 307, to the electrostatic conveyance belt 308 in such a manner that the fore end of a toner image on the circumferential surface of the most upstream photosensitive drum 310Y, the opposite point of the rotating electrostatic conveyance belt 308, and the recording start position of the transfer material 304 coincide with one another.

The image forming apparatus 103 further causes the charging devices 311 to uniformly charge the surfaces of the photosensitive drums 310, and causes the exposure devices 312 to expose the circumferential surfaces of the photosensitive drums 310 according to an image signal, thus forming electrostatic latent images on the circumferential surfaces of the photosensitive drums 310. The developing devices 313 apply, to between each of the developing rollers $313y2$, $313c2$, $313m2$, and $313k2$ and each of the photosensitive drums 310, voltages having the same charging polarity and the same electric potential as those of the photosensitive drums 310 in such a way as cause toner to adhere to the electrostatic latent images on the photosensitive drums 310, thus performing a developing operation to cause toner to adhere to the electrostatic latent images.

The image forming apparatus 103 applies a bias voltage to the roller 309 to form an electric field between the roller 309 and the grounded roller 318a and to generate dielectric polarities between the electrostatic conveyance belt 308 and the transfer material 304, thus conveying the transfer material 304 while electrostatically attracting the transfer material 304 to the electrostatic conveyance belt 308.

Furthermore, since, after this, electrostatic attraction is generated between the electrostatic conveyance belt 308 and the transfer material 304 due to the electric field of the transfer unit, the transfer material 304 is sequentially conveyed to the next transfer unit along the electrostatic conveyance belt 308.

In this way, toner images on the photosensitive drums 310 are sequentially transferred onto the conveyed transfer material 304 in the order of yellow, cyan, magenta, and black according to the application of voltages from the transfer rollers 319.

The transfer material 304, onto which the toner images of four colors have been transferred, is separated from the electrostatic conveyance belt 308 at the driving roller 320. Then, the transfer material 304, to which the toner images have been thermally fixed at the fixing unit 323, is discharged to a discharge unit 301 via a discharge roller pair 326.

(Density Control Processing)

Figure 4:
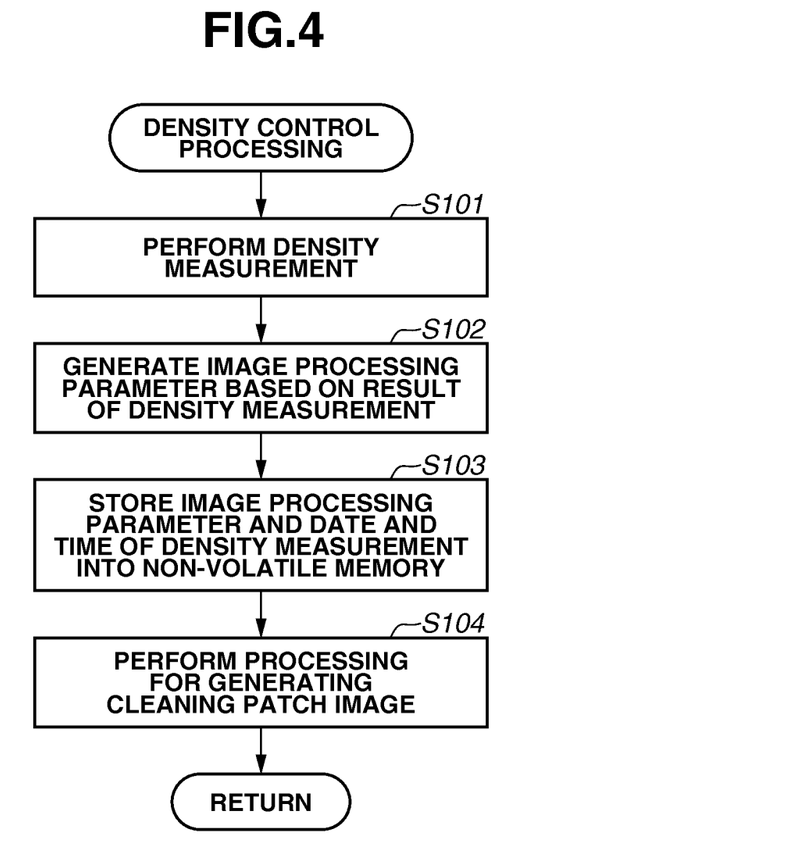
FIG. 4 is a flowchart illustrating density control processing performed by the image forming apparatus according to the first exemplary embodiment.

FIG. 4 is a flowchart illustrating density control processing performed by the image forming apparatus 103 according to the present exemplary embodiment.

Furthermore, a control program for performing processing in each step in the flowchart of FIG. 4 is loaded on the RAM 203, and the processing in the flowchart of FIG. 4 is performed by the CPU 201 executing the control program. In step S101, to form, on the electrostatic conveyance belt 308, a patch image for density measurement stored in the non-volatile memory 202, the CPU 201 transmits a signal for forming the patch image for density measurement to the print engine 113 via the engine I/F 206.

The patch image for density measurement is prepared for each of colors yellow, magenta, cyan, and black, and the density measurement patch image for each color is composed of a plurality of patch images. Furthermore, the plurality of patch images has respective different densities. The CPU 201 transmits signals for the density measurement patch images for respective colors yellow, magenta, cyan, and black.

The print engine 113 forms patch images on the electrostatic conveyance belt 308 using the signals for forming the density measurement patch images, which have been transmitted in step S101. Then, the CPU 201 causes a density sensor (not illustrated) to detect the formed patch images, thus measuring a density value of each patch image.

In this measurement, when the setting range of density levels in the print engine 113 is from "0" (white) to "255" (black), the print engine 113 measures an output density of the formed patch image in five density levels, i.e., density levels "1", "64", "128", "192", and "255".

In the present exemplary embodiment, patch images of the respective density levels are drawn on the electrostatic conveyance belt 308, and the density sensor measures the density of each patch image.

Furthermore, density level "0" is used to obtain a measurement error.

Figure 8:
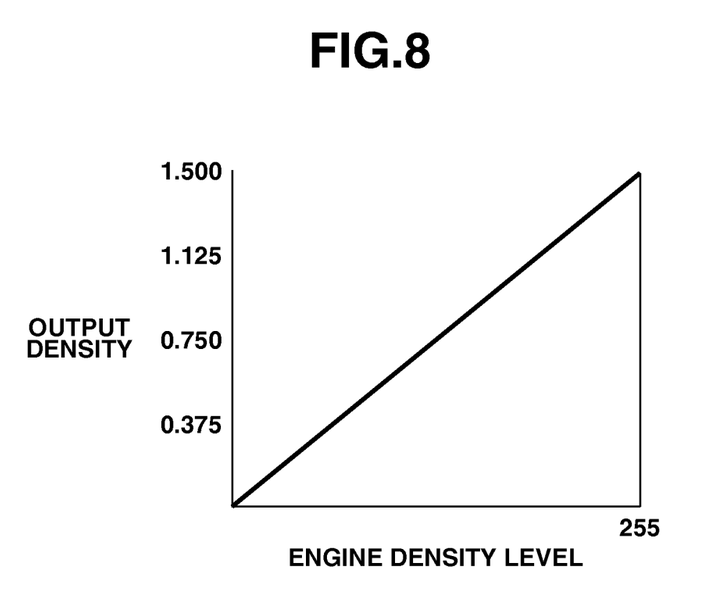
FIG. 8 is a graph illustrating the output density of a patch image for density measurement and the engine density level.

FIG. 8 is a graph illustrating characteristics of ideal output densities (targets) relative to engine density levels in a conventional image forming apparatus.

In step S102, the CPU 201 acquires a difference between the density illustrated in FIG. 8 and the measured density value.

Then, to bring the measured density value close to the ideal density illustrated in FIG. 8, the CPU 201 generates image processing parameters (density correction values) for generating a cleaning patch image and a PDL image. The CPU 201 then stores the generated image processing parameters into the RAM 203.

In step S103, the CPU 201 stores, into the non-volatile memory 202, the generated image processing parameters (density correction values) and the date and time when the CPU 201 performed the measurement of density values.

In step S104, the CPU 201 performs processing for generating a cleaning patch image. The details of the processing in step S104 are described below with reference to FIG. 5.

(Processing for Generating Cleaning Patch Image)

Figure 5:
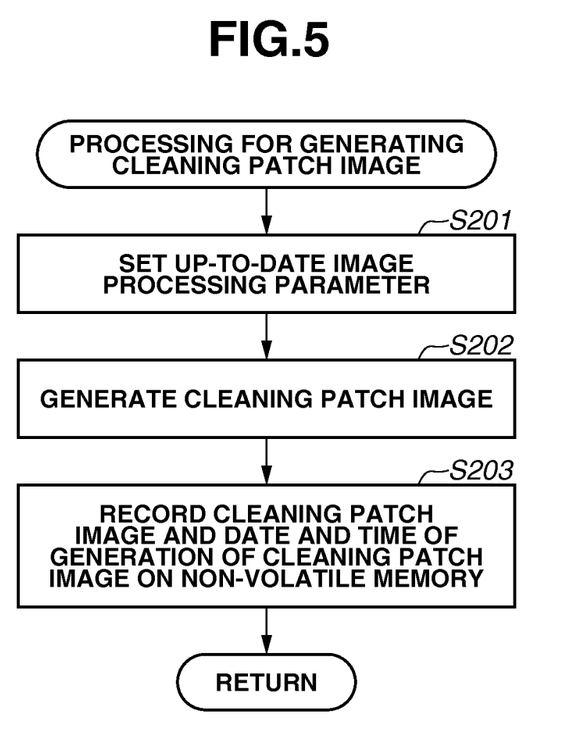
FIG. 5 is a flowchart illustrating cleaning patch image generation processing performed by the image forming apparatus according to the first exemplary embodiment.

FIG. 5 is a flowchart illustrating cleaning patch image generation processing performed by the image forming apparatus 103 according to the first exemplary embodiment.

Furthermore, a control program for performing processing in each step in the flowchart of FIG. 5 is loaded on the RAM 203, and the processing in the flowchart of FIG. 5 is performed by the CPU 201 executing the control program.

Upon receiving a cleaning patch image generation instruction, in step S201, the CPU 201 sets up-to-date image processing parameters, which are recorded on the RAM 203, to the image processing unit 207.

In step S202, the CPU 201 instructs the rendering unit 208 and the image processing unit 207 to generate a cleaning patch image. Under the instruction of the CPU 201, the rendering unit 208 performs rendering processing to generate a cleaning patch image of the bitmap format, which is a band-like image having a uniform density, from the PDL job. Next, the image processing unit 207 performs density correction on the cleaning patch image generated by the rendering unit 208 in such a manner that the engine density level becomes adequate, and records the density-corrected cleaning patch image on the RAM 203. As a result, the cleaning patch image becomes an image enabling an amount of toner intended by the controller 112 to be supplied to the cleaning blade.

In step S203, after generating the cleaning patch image, the CPU 201 records, on the non-volatile memory 202, the cleaning patch image and the date and time of generation of the cleaning patch image.

(Print Processing)

Figure 6:
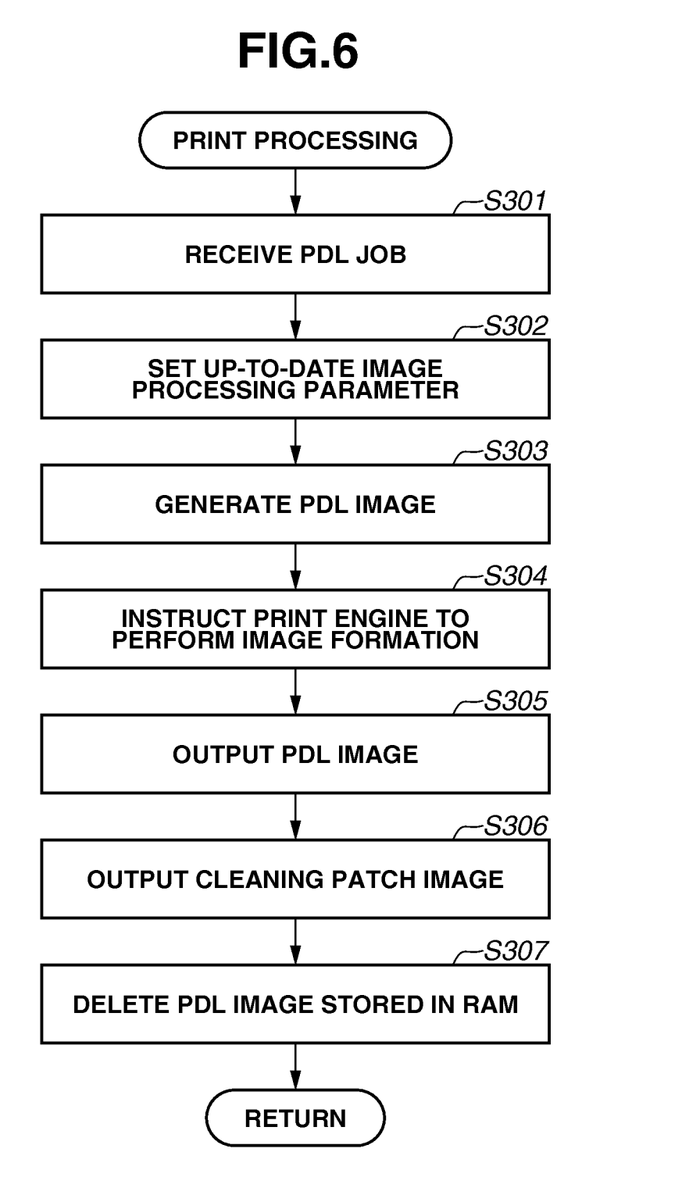
FIG. 6 is a flowchart illustrating print processing performed by the image forming apparatus according to the first exemplary embodiment.

FIG. 6 is a flowchart illustrating print processing performed by the image forming apparatus 103 according to the present exemplary embodiment.

Furthermore, a control program for performing processing in each step in the flowchart of FIG. 6 is loaded on the RAM 203, and the processing in the flowchart of FIG. 6 is performed by the CPU 201 executing the control program.

Moreover, the print processing illustrated in FIG. 6 is performed after the cleaning patch image generation processing illustrated in FIG. 5 is performed.

In step S301, the host I/F 204 receives the PDL job transmitted from the data processing apparatus 102 and records the received PDL job on the RAM 203.

In step S302, the CPU 201 sets the up-to-date image processing parameters, which are recorded on the RAM 203, to the image processing unit 207.

In step S303, the CPU 201 instructs the rendering unit 208 and the image processing unit 207 to generate a PDL image. Under the instruction of the CPU 201, the rendering unit 208 performs rendering processing to generate a PDL image of the bitmap format from the PDL job. Next, the image processing unit 207 performs image processing on the PDL image generated by the rendering unit 208 in such a manner that the engine density level becomes adequate, and records the processed PDL image on the RAM 203.

After generation of the PDL image, in step S304, the CPU 201 instructs the print engine 113 via the engine I/F 206 to perform image formation.

After instructing the print engine 113 to perform image formation, in step S305, the CPU 201 receives a PDL image start signal from the print engine 113 via the engine I/F 206. In response to the PDL image start signal, the engine I/F 206 transmits the PDL image stored in the RAM 203 to the print engine 113. According to the transmitted PDL image, the print engine 113 forms an electrostatic latent image on the photosensitive drum 310 and causes toner to adhere to the electrostatic latent image, thus forming a toner image. After formation of the toner image, the print engine 113 transfers the toner image onto a transfer material 304, which has been fed from a sheet feed port, thermally fixes the toner image to the transfer material 304, and then discharges the transfer material 304 to a sheet discharge port.

After transmission of the PDL image, in step S306, the CPU 201 receives a cleaning patch image start signal from the print engine 113 via the engine I/F 206. In response to the cleaning patch image start signal, the engine I/F 206 transmits, to the print engine 113, a signal for forming the generated cleaning patch image, which is stored in the RAM 203. According to the transmitted signal for forming the cleaning patch image, the print engine 113 forms an electrostatic latent image on the photosensitive drum 310, and then causes toner to adhere to the electrostatic latent image, thus forming a toner image.

The toner adhering to an inter-sheet interval on the photosensitive drum 310 according to the formation of the cleaning patch image in the above-described way remains on the photosensitive drum 310 as it is since no transfer material 304 is present there, and then advances to the cleaning device 315. The toner having reached the cleaning device 315 stays, as a certain amount of lubricant, on a contact portion of the cleaning blade. The toner staying as a certain amount of lubricant enables reducing a frictional load when removing unnecessary toner on the photosensitive drum 310. Furthermore, a result of the density control processing is also reflected in the amount of toner used for the cleaning device 315.

In step S307, after completion of outputting of the PDL image, the CPU 201 deletes the PDL image and the PDL job, which are stored in the RAM 203. Then, the print processing ends.

Figure 7:
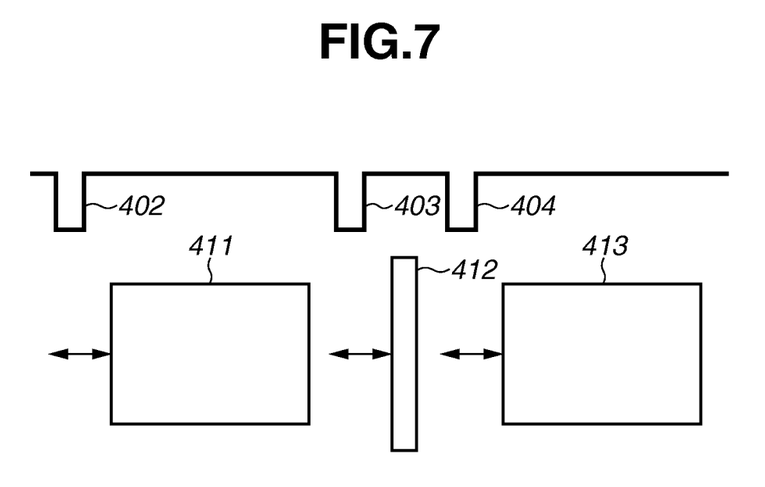
FIG. 7 illustrates a relationship between the waveform of a signal line and images output from the controller according to the first exemplary embodiment.

FIG. 7 illustrates a relationship between the waveform of a signal line and images that the controller 112 outputs, according to the present exemplary embodiment.

PDL images 411 and 413 are images (corresponding to a first image and a second image) formed on the photosensitive drum 310, which are to be transferred onto the transfer materials 304, and are output from the controller 112 to the print engine 113 according to PDL image start signals 402 and 404, respectively. A cleaning patch image 412 is formed in an interval (inter-sheet interval) between images formed on the photosensitive drum 310 to be transferred onto the sheets, according to a cleaning patch image start signal 403.

As described above, according to the first exemplary embodiment, after an image processing parameter is generated from a density measurement result in density control processing, a cleaning patch image on which image processing for making an engine density level adequate is performed is previously generated. As a result, it becomes possible to output a cleaning patch image, which serves as an adequate amount of lubricant, to the cleaning blade in an inter-sheet interval while maintaining the maximum throughput of continuous printing.

In the first exemplary embodiment, processing for generating a cleaning patch image is performed regardless of a density measurement result in density control processing. However, in a case where density measurement is unsuccessful (in other words, results in error), since an image processing parameter is not changed, it is not necessary to perform the processing for generating a cleaning patch image.

Therefore, according to a second exemplary embodiment of the present invention, a part of the density control processing performed in the first exemplary embodiment is changed, so that the processing for generating a cleaning patch image is omitted in a case where density measurement is unsuccessful.

(Density Control Processing)

Figure 9:
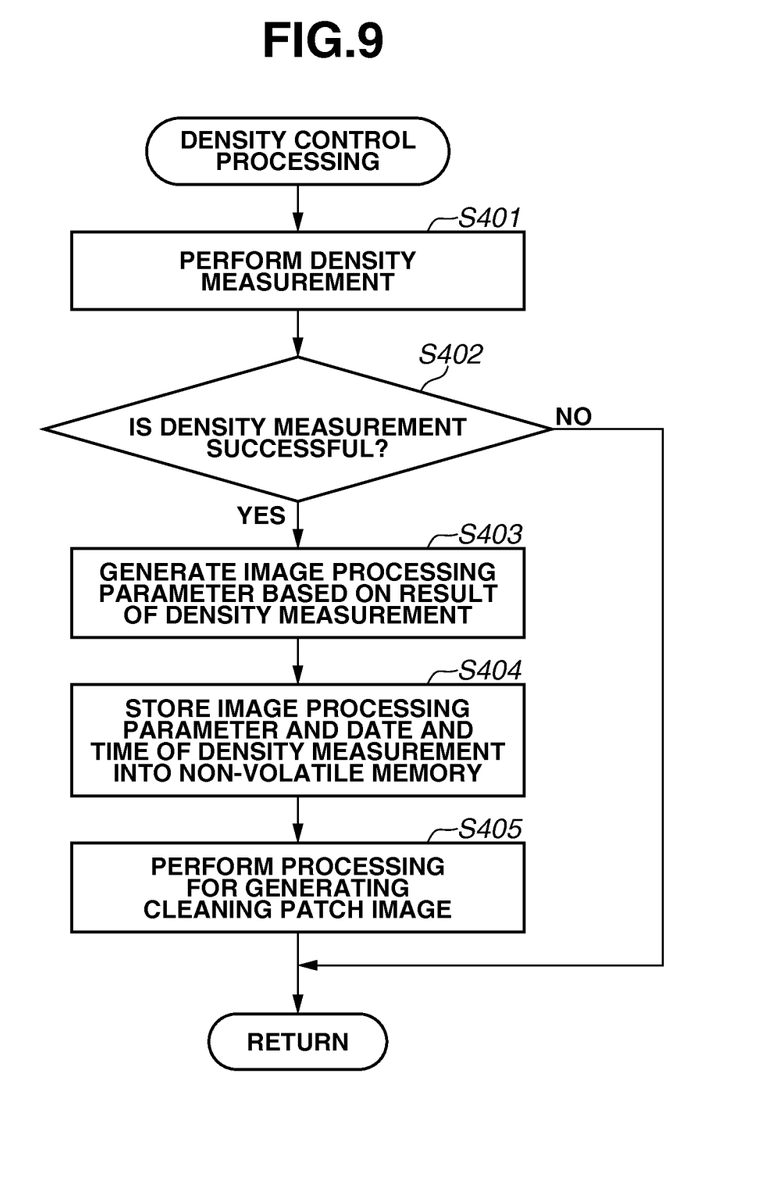
FIG. 9 is a flowchart illustrating density control processing performed by the image forming apparatus according to a second exemplary embodiment of the present invention.

FIG. 9 is a flowchart illustrating density control processing performed by the image forming apparatus 103 according to the second exemplary embodiment.

Furthermore, a control program for performing processing in each step in the flowchart of FIG. 9 is loaded on the RAM 203, and the processing in the flowchart of FIG. 9 is performed by the CPU 201 executing the control program.

In step S401, the CPU 201 performs density measurement as in step S101 illustrated in FIG. 4.

In step S402, the CPU 201 checks whether the density measurement in density control processing is successful. If the CPU 201 determines that the density measurement is successful (YES in step S402), the processing proceeds to step S403. If the CPU 201 determines that the density measurement terminates abnormally (an error occurs) due to some reason (NO in step S402), the density control processing ends.

Processing in step S403 to step S405 is similar to that in step S102 to step S104 in the flowchart of FIG. 4.

As described above, according to the second exemplary embodiment, in a case where density measurement processing in density control processing terminates abnormally, processing for generating a cleaning patch image is omitted, so that the time of unnecessary processing can be reduced.

In a case where the processing for generating a cleaning patch image is interrupted due to power shutdown or the like occurring after the density measurement in density control processing illustrated in FIG. 4, the cleaning patch image cannot be generated until the next density control processing is performed. This results in the use of a cleaning patch image generated based on an image processing parameter in which an up-to-date density measurement result is not reflected. Therefore, the amount of toner supplied to the cleaning device 315 may become inadequate.

Therefore, according to a third exemplary embodiment of the present invention, startup processing is changed such that, in a case where the processing for generating a cleaning patch image is interrupted, the generation of a cleaning patch image is performed at the time of startup.

(Startup Processing)

Figure 10:
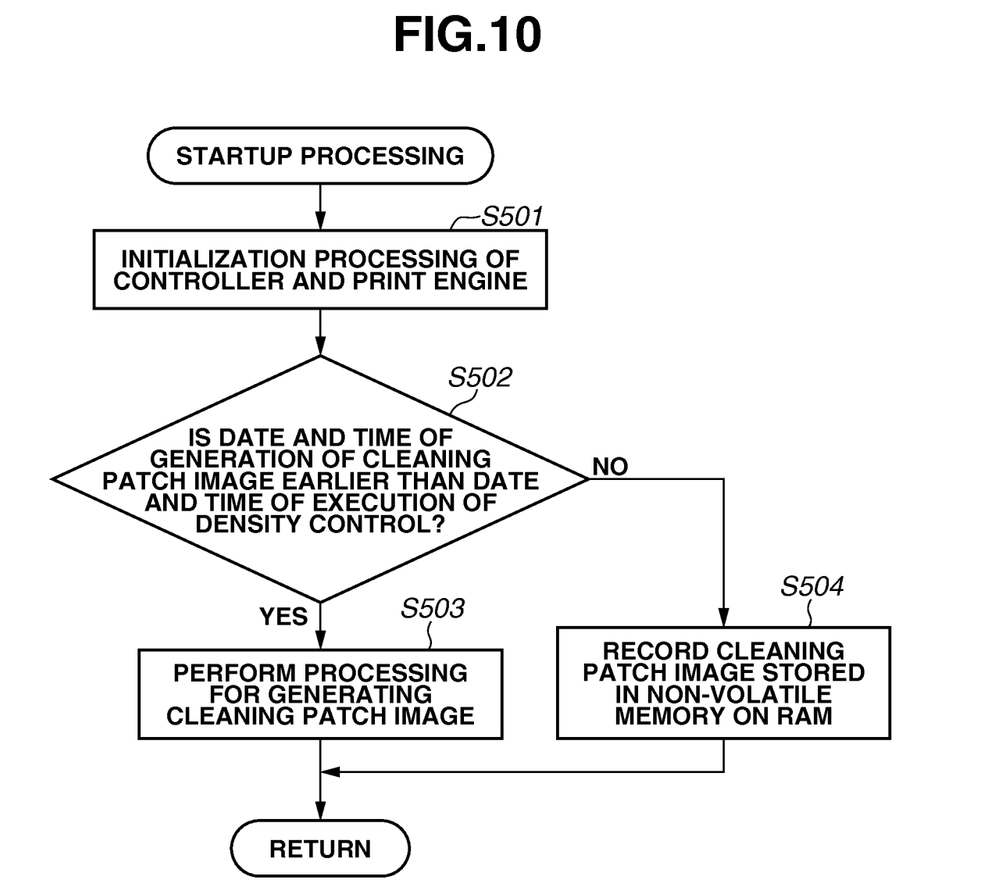
FIG. 10 is a flowchart illustrating startup processing performed by the image forming apparatus according to a third exemplary embodiment of the present invention.

FIG. 10 is a flowchart illustrating startup processing performed by the image forming apparatus 103 according to the third exemplary embodiment.

Furthermore, a control program for performing processing in each step in the flowchart of FIG. 10 is loaded on the RAM 203, and the processing in the flowchart of FIG. 10 is performed by the CPU 201 executing the control program. When a power switch of the image forming apparatus 103 is turned on, in step S501, the controller 112 and the print engine 113 as powered on each perform initialization processing. After initialization of the controller 112, in step S502, the CPU 201 makes a comparison between the date and time of generation of the cleaning patch image, which is recorded on the non-volatile memory 202, and the date and time of execution of density control. If, as a result of the comparison, the CPU 201 determines that the date and time of generation of the cleaning patch image is earlier than the date and time of execution of density control (YES in step S502), the processing proceeds to step S503. If, as a result of the comparison, the CPU 201 determines that the date and time of execution of density control is earlier than the date and time of generation of the cleaning patch image (NO in step S502), the processing proceeds to step S504.

In step S503, the CPU 201 performs the processing for generating a cleaning patch image. In this case, the processing for generating a cleaning patch image is performed using an image processing parameter obtained in the density control processing performed before startup. The CPU 201 performs print processing to output a cleaning patch image using data about the cleaning patch image obtained by the generation processing.

On the other hand, in step S504, the CPU 201 copies, to the RAM 203, data about a cleaning patch image recorded on the non-volatile memory 202, and outputs a cleaning patch image in print processing using the data stored in the RAM 203.

As described above, according to the third exemplary embodiment, even if the generation for generating a cleaning patch image is interrupted, in a case where, at the time of next startup, it is determined that the date and time of generation of a cleaning patch image is earlier than the date and time of execution of density control, the generation of a cleaning patch image is performed. As a result, the amount of toner to be supplied to the cleaning device 315 can be made adequate.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or -ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242458 filed Nov. 28, 2014, which is hereby incorporated by reference herein in its entirety.

What is claimed is:

1. An image forming apparatus comprising:
a measurement unit configured to measure a density of an image that an image forming unit forms;
an acquisition unit configured to acquire an image processing parameter serving as a correction value used to correct the density of the image measured by the measurement unit;
a generation unit configured to generate a cleaning patch image using the image processing parameter acquired by the acquisition unit; and
a cleaning patch image forming unit configured to form the cleaning patch image generated by the generation unit on an image bearing member,
wherein the cleaning patch image is formed during an interval after a first image is formed by the image forming unit on the image bearing member but before a second image having a printing instruction issued subsequent to a printing instruction issued for the first image is formed by the image forming unit on the image bearing member, and
wherein if a result of measurement obtained by the measurement unit measuring the density of the image indicates an error, the generation unit interrupts generation of the cleaning patch image.

2. The image forming apparatus according to claim 1, further comprising a cleaning unit configured to remove, using a cleaning blade kept in contact with the image bearing member, toner adhering to the image bearing member caused by the cleaning patch image forming unit forming the cleaning patch image.

3. The image forming apparatus according to claim 1, wherein the acquisition unit acquires the image processing parameter based on a difference between a result of measurement obtained by the measurement unit measuring the density of an image formed by the image forming unit and a target.

4. The image forming apparatus according to claim 1, further comprising a comparison unit configured to make a comparison between a date and time when the measurement unit measured the density of the image and a date and time when the generation unit generated the cleaning patch image,
wherein, when the image forming apparatus is started up, if the comparison made by the comparison unit indicates that the date and time when the measurement unit measured the density of the image is earlier than the date and time when the generation unit generated the cleaning patch image, the generation unit generates a cleaning patch image.

5. The image forming apparatus according to claim 1, wherein the generation unit generates the cleaning patch image before print processing is performed by the image processing unit.

6. An image forming method comprising:
measuring a density of an image that an image forming unit forms;
acquiring an image processing parameter serving as a correction value used to correct the measured density of the image;
generating a cleaning patch image using the acquired image processing parameter; and
forming the generated cleaning patch image on an image bearing member, wherein the cleaning patch image is formed during an interval after a first image is formed by the image forming unit on the image bearing member but before a second image having a printing instruction issued subsequent to a printing instruction issued for the first image is formed by the image forming unit on the image bearing member, and wherein if measuring of the density of the image indicates an error, generation of the cleaning patch image is interrupted.

7. A non-transitory computer-readable storage medium storing computer executable instructions that, when executed by a computer, cause the computer to execute a method comprising:

measuring a density of an image that an image forming unit forms;

acquiring an image processing parameter serving as a correction value used to correct the measured density of the image;

generating a cleaning patch image using the acquired image processing parameter; and forming the generated cleaning patch image on an image bearing member, wherein the cleaning patch image is formed during an interval after a first image is formed by the image forming unit on the image bearing member but before a second image having a printing instruction issued subsequent to a printing instruction issued for the first image is formed by the image forming unit on the image bearing member, and wherein if measuring of the density of the image indicates an error, generation of the cleaning patch image is interrupted.

* * * * *